(12) United States Patent
Ebinger et al.

(10) Patent No.: US 6,846,023 B2
(45) Date of Patent: Jan. 25, 2005

(54) SINGLE-PIECE CONNECTOR CLAMP

(75) Inventors: Günther Ebinger, Backnang (DE); Alexander Roser, Mutlangen (DE)

(73) Assignee: CTS Fahrzeug - Dachsysteme GmbH, Hamburg (DE)

(*) Notice: Subject to any disclaimer, the term of this patent is extended or adjusted under 35 U.S.C. 154(b) by 0 days.

(21) Appl. No.: 10/254,085

(22) Filed: Sep. 24, 2002

(65) Prior Publication Data

US 2003/0067163 A1 Apr. 10, 2003

Related U.S. Application Data

(63) Continuation-in-part of application No. PCT/EP01/03248, filed on Mar. 22, 2001.

(30) Foreign Application Priority Data

Mar. 25, 2000 (DE) .......................................... 100 15 028

(51) Int. Cl.[7] ............................................... F16L 25/00
(52) U.S. Cl. ........................ 285/420; 285/406; 285/305; 285/114; 24/563
(58) Field of Search ............................... 285/305, 261, 285/114, 325, 420, 406; 24/23 R, 563, 545

(56) References Cited

U.S. PATENT DOCUMENTS

| | | | | |
|---|---|---|---|---|
| 2,240,078 A | * | 4/1941 | Rader .......................... | 285/261 |
| 4,333,505 A | * | 6/1982 | Jones et al. .................. | 285/305 |
| 4,403,378 A | * | 9/1983 | Engman ...................... | 285/420 |
| 4,913,468 A | * | 4/1990 | Rattmann .................... | 285/114 |
| 5,348,353 A | | 9/1994 | Deweerdt | |
| 5,350,201 A | | 9/1994 | Bynum | |
| 5,501,195 A | * | 3/1996 | Hall ........................... | 285/305 |
| 5,820,168 A | | 10/1998 | De Giacomoni | |
| 5,893,351 A | * | 4/1999 | Akutagawa et al. ......... | 285/305 |
| 6,179,345 B1 | * | 1/2001 | Gensert et al. .............. | 285/305 |
| 6,409,228 B1 | * | 6/2002 | Fadini et al. ................ | 285/305 |

FOREIGN PATENT DOCUMENTS

| | | |
|---|---|---|
| DE | 41 01 849 A1 | 7/1992 |
| DE | 44 44 550 A1 | 6/1996 |
| DE | 197 28 973 A1 | 1/1999 |
| EP | 919 760 A2 | 6/1999 |

* cited by examiner

Primary Examiner—David E. Bochna
(74) Attorney, Agent, or Firm—Klaus J. Bach

(57) ABSTRACT

In a single-piece connector clamp for flange connections of pipe sections wherein the clamp has a U-shaped spring back with opposite legs and spring arms extending from the legs in spaced relationship and forming spring arm pairs disposed at opposite sides of a reception space for the connector flanges, the connector clamp includes in the center area of the web a cutout area which extends from the base of a spring arm to the adjacent spring arm base so that the spring arms of the single piece connector clamp are supported resiliently for independent clamping action.

14 Claims, 4 Drawing Sheets

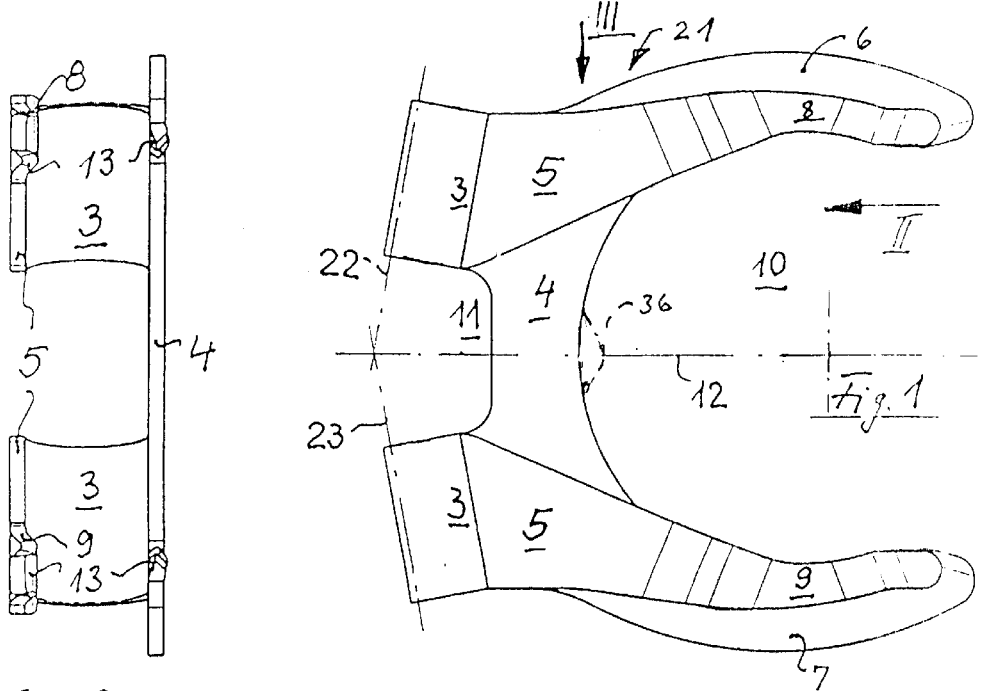
Fig. 2
Fig. 1
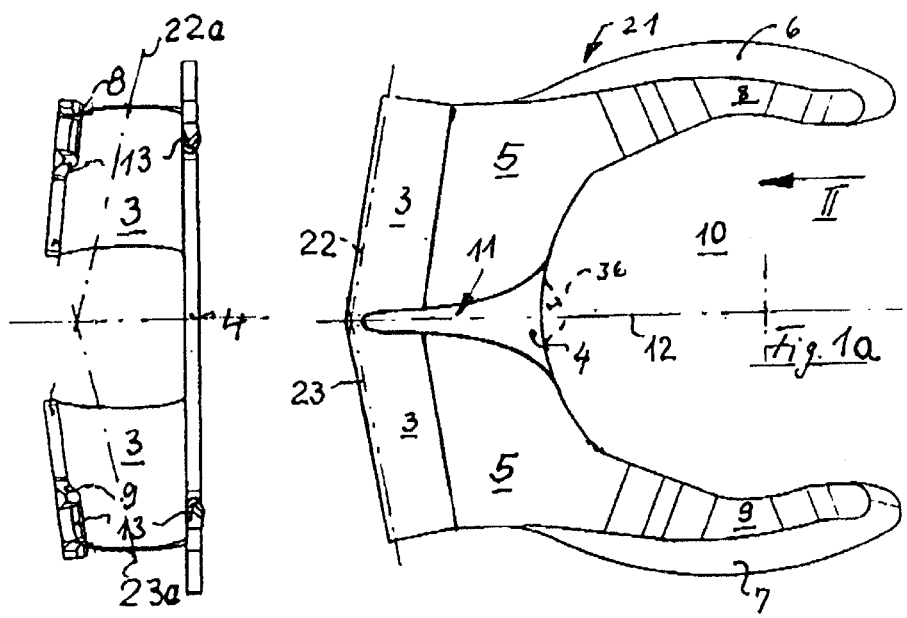
Fig. 2a
Fig. 1a

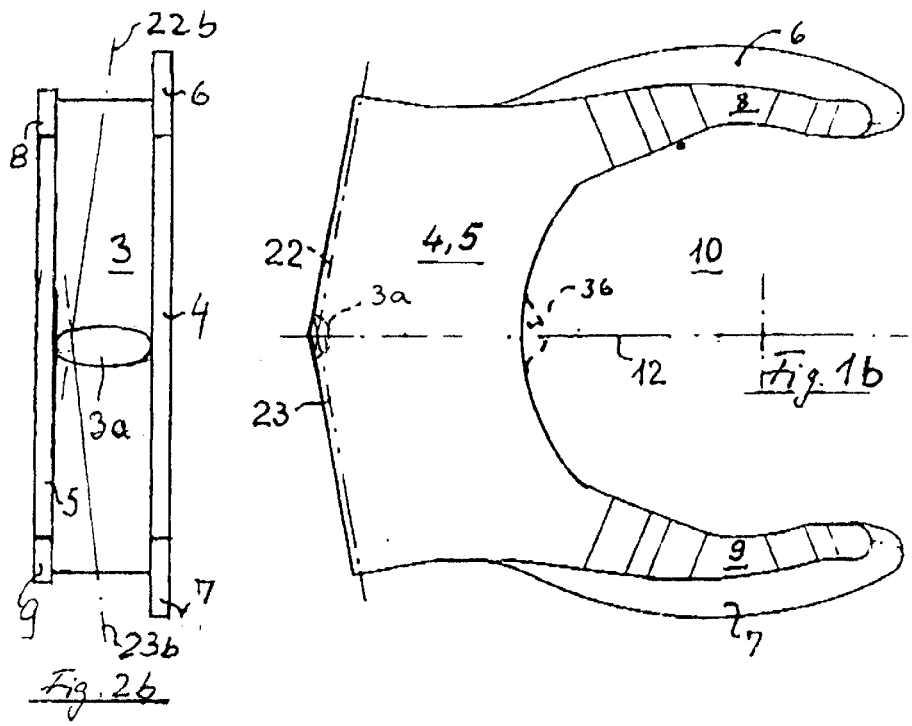
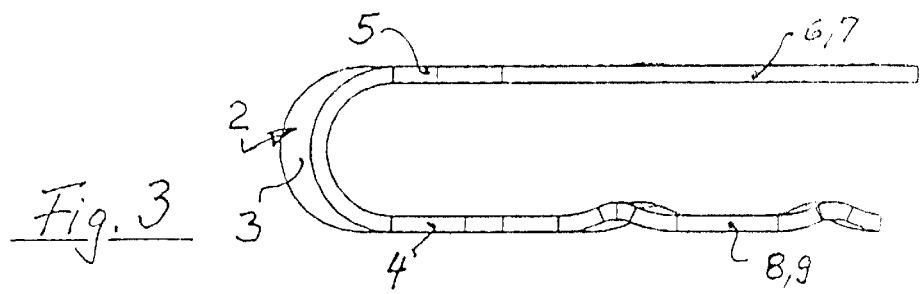
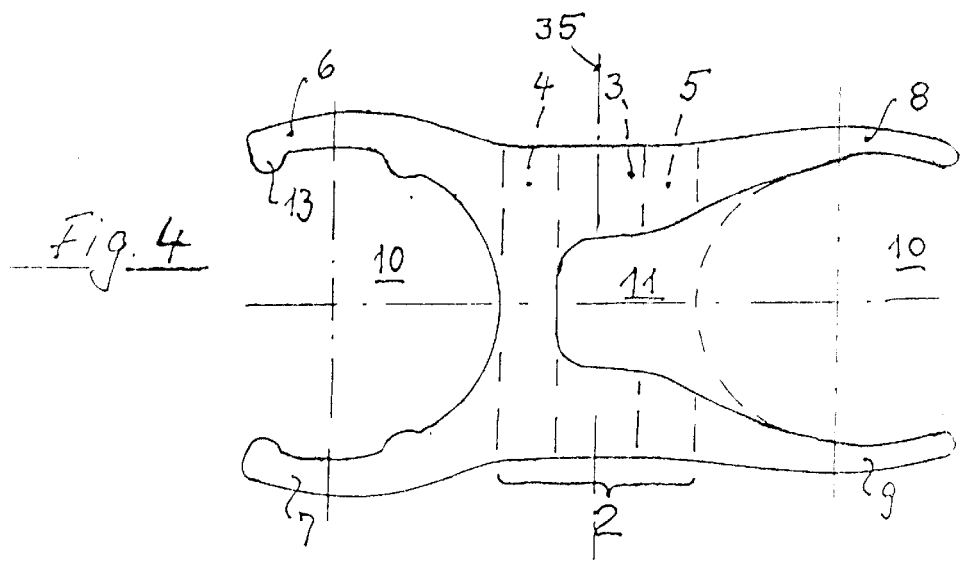

SINGLE-PIECE CONNECTOR CLAMP

This is a Continuation-In-Part application of international patent application PCT/EP01/03248 filed Mar. 22, 2001 and claiming the priority of German application No. 100 15 028.4 filed Mar. 25, 2000.

BACKGROUND OF THE INVENTION

The invention relates to a single piece connector clamp for flange connections made from a spring metal sheet, particularly. The connector clamp is particularly suitable for flange connections of exhaust pipes of motor vehicles. It includes a U-shaped spring back and legs which are joined by a web. From each leg two spring arms extend in spaced relationship from one another in the direction of the web and form a pair of springs with a space therebetween for receiving the flanges.

It is known from DE 44 44 550 A1 to use for flange connections of exhaust gas pipes of motor vehicles Belleville-type plate springs which are moved onto the tubes and which are held together to axially engaging the flanges therebetween. Such an arrangement however has certain limitations particularly with respect to the assembly of the structure.

A spring clamp structure in the form of a connector clamp has relatively wide applicability particularly with regard to the assembly of components. Single piece connector clamps of spring steel sheets of the type referred to above are known however from DE 197 28 973 A1. In these known solutions, the connector clamp has a U-shaped spring back with legs which extend opposite each other along a web but have ends that extend transverse to the web and are provided with spring arms extending from the legs. In this way, the connector clamp can extend from one side over the pipe sections to be joined when being installed on the pipes and engage with its spring arms the oppositely facing flange surfaces of the tube sections to be joined. At the same time the tubes are centered during the axial engagement thereof.

It is the object of the present invention to provide a connector clamp for flange connections of pipes which can be easily adapted to various applications and which is easy to manufacture.

SUMMARY OF THE INVENTION

In a single-piece connector clamp for flange connections of pipe sections wherein the clamp has a U-shaped spring back with opposite legs and spring arms extending from the legs in spaced relationship and forming spring arm pairs disposed at opposite sides of a reception space for the connector flanges. Preferably, the connector clamp includes in the center area of the web a cutout area which extends from the base of a spring arm to the adjacent spring arm base so that the spring arms of the single piece connector clamp are supported resiliently for independent clamping action.

With such an arrangement, the clamp design can easily be adapted to the clamping force requirement by appropriately sizing the cutouts in the transverse web area that is in the area between the extension of the legs beyond the web. This permits also adaptation to different stress conditions with respect to the spring arms cooperating in the axial clamping in order to adapt the clamp for example to different clamping conditions as they may be present in a horizontal pipe connection at the top and at the bottom of the pipe. This is particularly true if a radial stop for supporting the connecting clamp is provided in the web area or if the web area forms such a stop. The stop may engage directly the flange or the part on which the flange is provided that is, particularly, a pipe part.

Such a cutout between the spring arms of a spring arm pair permits also an angled arrangement of the spring back portion between the spring arms. In this way the support or rather clamping conditions can be adjusted and the material use in the area of the spring back can be minimized and/or the space requirements for the installation of the clamp can be reduced.

The invention will become more readily apparent from the following description thereof on the basis of the accompanying drawings.

BRIEF DESCRIPTION OF THE DRAWINGS

FIG. 1 shows a connector clamp according to the invention wherein the area between the spring arm is curved in accordance with the curvature of the pipes which are joined by the connector clamp, FIG. 1a shows an embodiment with a particular shape of a cutout in the area between the spring arms, FIG. 1b shows the connector clamp of FIGS. 1 and 1a without a cutout in the area between the spring arms, FIG. 2 is a side view of the connector clamp shown in FIG. 1 as seen in the direction of the arrow II of FIG. 1, FIG. 2a shows the structure according to FIG. 2 with the clamping arm support web and their pivot axes somewhat inclined, FIG. 2b is a side view of the connector clamp as shown in FIG. 1b, FIG. 3 is another side view of the connector clamp shown in FIG. 1 as seen in the direction of arrow III of FIG. 1, FIG. 4 shows a punched out metal sheet piece for the manufacture of the connector clamp as shown in FIGS. 1–3.

DETAILED DESCRIPTION OF PREFERRED EMBODIMENTS

Figure 5:
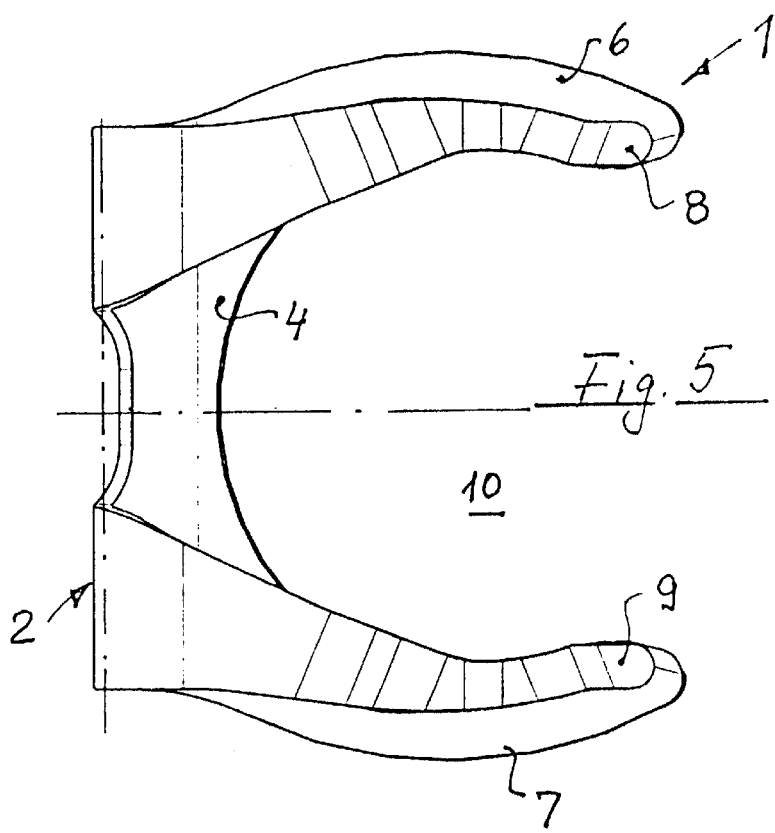
FIG. 5 shows an embodiment of the connector clamp in which the web between the spring arms is arranged in axial alignment.

FIGS. 1, 1a, 5, 6, 6a and 6b are each a top view of a connector clamp according to the invention showing the basic design. FIG. 4 shows a planar stamping from which a clamp as shown in FIG. 5 is formed. The clamp according to FIG. 4 has spring arms, which are bendable about spring back areas with aligned axes.

Accordingly, the connector clamp will first be described on the basis of FIGS. 4 and 5 for an explanation of the basic design.

The connector clamp as shown in FIG. 5 is designated as a whole by the reference numeral 1. As apparent from FIG. 4, it is formed from a single piece flat spring steel sheet from which is its stamped out and bent to the basic U-shape as shown in FIG. 3. The spring back 2 as shown in FIG. 3 is curved in the shape of a U and includes a transverse web 3. At the opposite ends, the transverse web 3 forms opposite legs 4 and 5. The transition is gradual so that the spring back 2 which comprises the web 3 and the legs 4 and 5 is, in cross-section curved or arched particularly, in a circular shape. However, other shapes for example with legs 4 and 5 which are not smoothly curved about the longitudinal axis of the web but which have abruptly bent areas are possible.

In FIG. 4, the area of the stamping which forms in the bent state the spring back 2 is indicated by the respective divisions wherein the area of the web 3 and the areas of the legs 4 and 5 are delimited by dashed lines.

The legs 4 and 5 carry spaced spring arms 6, 7 and, respectively, 8, 9. The spring arms 6, 7 extend from the leg 4 and the spring arms 8, 9 extend from the leg 5. The spring arms 6, 7 and respectively, 8, 9 extending from a leg 4 and respectively, 5 of the web 3 form respective spring arm pairs 6, 7 and 8, 9 and the spring arms 6, 7 and 8, 9 of the respective spring arm pair delimit a receiver space 10 of a pipe section. The connector clamp 1 can be moved from the side onto the pipe such that the spring arms 6, 7 and 8, 9 respectively, of a spring arm pair engage one of the opposite outer sides of the flanges to be clamped together. In this way, the pipe sections to be joined are firmly engaged in axial direction and even centered and aligned.

With the design of the connector clamp 1 as shown in FIGS. 1, 1a, 5 and 6, the spring back 2, which includes the web 3 and the legs 4, 5 is provided in the area between the spring arms 8, 9 of the spring arm pair with a cutout 11 extending up, and into, the area of the web 3. In this way the spring back 2 is interrupted in the area of the leg 5 which carries the spring arms 8, 9. The spring arms 8, 9 of the spring arm pair extending from the leg 5 are connected with the leg 4 which carries the spring arms 6, 7 of the other spring arm pair only by way of the remaining end areas of the web 3.

As shown in FIG. 4, the cut-out 11 may extend in a transverse direction over the full width of the web or only over a part thereof so that, basically, in the axial clamping direction of the U-shaped connector clamp 1, the respective opposite spring arms 6 and 8 and respectively, 7 and 9, form essentially independent clamping structures which are only interconnected by the leg 4, which carries the spring arms of the spring arm pairs 6, 7. In this way, different spring structures can be obtained with a single piece connector clamp, which is manufactured from a stamped out flat material sheet. And still the corresponding spring arms 6, 8 and 7, 9 of the two spring pairs can be adjusted individually to a particular axial clamping force and also the pipe centering force of the two springs arm pairs 6, 7 and 8, 9 effective in a direction transverse to the clamping force can be adjusted in a wide range. As a result, the connector clamp 1 can be adapted to different stress situations while the basic construction of the connector clamp remains unchanged.

Figure 6:
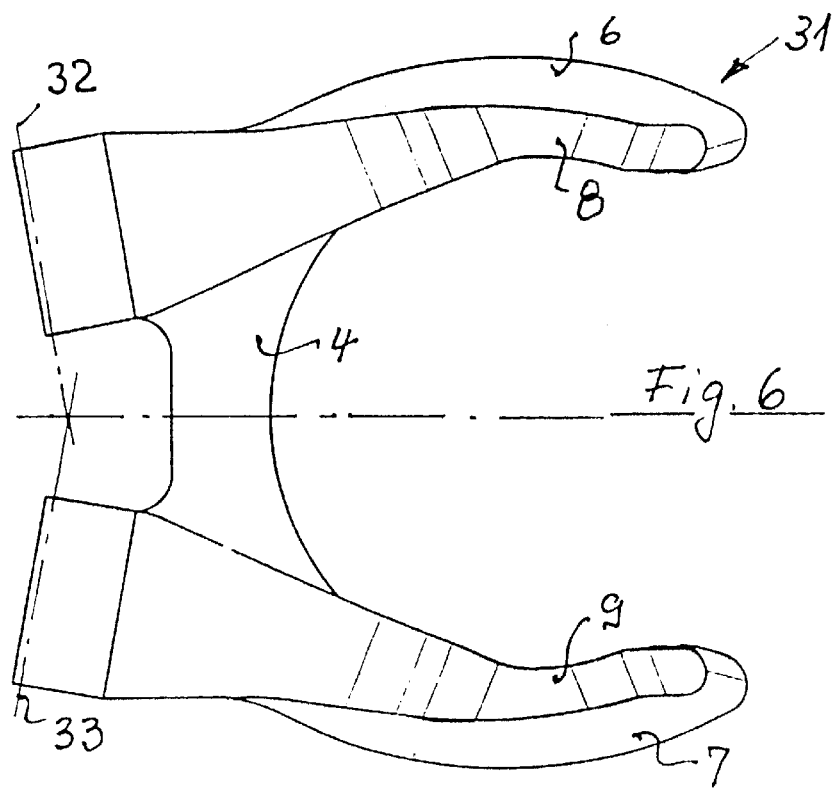
FIG. 6, shows an arrangement wherein the webs between the spring arms are bendable about axes, which extend at an angle relative to each other.

While on the basis of FIGS. 4 and 5, the basic design and a suitable embodiment of the connector clamp 1 have been presented and explained, FIGS. 1, 1a, 1b 6, 6a and 6b show modified embodiments. The design of the connector clamp 21 according to FIGS. 1 and 6 is shown in other view in FIGS. 2 and 3 for clarification. For the description of the connector clamp 21 according to FIG. 1 and the connector clamp 31 according to FIG. 6, the same reference numerals will be used as have been used in connection with FIGS. 4 and 5.

FIG. 1 shows for the connector clamp 21 in the area of the spring back 2 again a cutout 11 by which the spring back 2 is divided so that spaced leg sections 5 and web sections 3 are provided and the arms 8 and 9 of the pair of spring arms extending from the leg 5 form with the arms 6 and 7 of the opposite spring arm pair substantially independent axial clamping areas. These independent axial clamping areas are interconnected only by way of the leg 4 of the spring arm pair 6, 7 extending from the leg 4. With regard to the respective cooperating spring arms 6 and 8 and 7 and 9 of the cooperating spring pairs, a substantially individual design for the clamping structures is possible.

The arrangement as shown in FIG. 1 offers additional possibilities in that with the arched, particularly semicircularly bent, web parts 3 certain web bending axes 22, 23 can be established for the axially cooperating spring arm pairs 6, 8 and 7, 9 respectively. The axes 22, 23 may be disposed at an angle such that the areas of the spring back disposed at opposite sides of the cutout 11 extend essentially parallel to a tangent to the pipe to be engaged or the space 10 for receiving the pipe. The pivot axis 22, 23 of the spring arms 6, 8 and 7, 9, which are then roof-like angled, intersect in the area of the transverse axis or transverse plane 12 extending through the center of the space 10. In this way, the connector clamp 21 is of a particular space saving design. The angled areas of the spring back 2 may also be inclined in different ways whereby also the forces provided by the spring arms 8 and, respectively, 9, and the respective opposite spring arms 6, 7 of the spring pairs may be adjusted. The pivot axes 22, 23 are schematically indicated in FIG. 1. The distribution and the effective direction of the radial force components effective in the axial direction on the pipe flanges can be influenced in accordance with the invention by providing a stop 36 on the connector clamp 21 which abuts the pipe or the flange in order to limit the radial insertion depth of the clamp.

In FIG. 1a the cutout 11 extends only between the legs 5 of the arms 8, 9 and only partially into the web 3.

FIG. 1b shows the connector clamp without cutout in either of the legs 4, 5. Preferably, however a small transversely elongated opening 3a is provided in the center of the web 3 of the clamp in order to relieve tensions in that area and to facilitate the shaping of the clamp during manufacture.

FIG. 2 shows the connector clamp of FIG. 1 viewed in the direction of arrow II of FIG. 1, wherein the leg and adjacent web areas extend in parallel spaced planes.

FIG. 2a shows the leg and web areas dispose in planes, which are angled toward the center. As indicated by the axes 22a and 23a in this case also the bending axes of the connector arms 8 and 9 may be inclined with respect to the plane of the legs 4 of the arms 6 and 7.

FIG. 6 shows an embodiment of a connector clamp 31 with pivot axes 32 and 33, which are inclined in an opposite sense with respect to the curvature of the pipe that is opposite to the circumference curvature of the flange connection to be established by the connector clamp 31. Such an arrangement provides in the area of the spring back 2 for a particularly compact structure and makes a force transfer in the area of the spring back 2 possible wherein the ends of the arms 8, 9 in the area of the spring back 2 are subjected to a relatively low tension so that such an arrangement is suitable for the application of high clamping forces. The inclination of the pivot axes 32 and 33, which are angled in the direction toward the center of the reception space 10 may be varied also in this embodiment. In a preferred embodiment, the intersection of the pivot axes 22, 23 according to FIG. 1, or respectively, 32, 33 according to FIG. 6 is disposed in the transverse center plane 12 of the connector clamp 1 provided the clamp is symmetrical with respect to that plane.

Figure 6A:
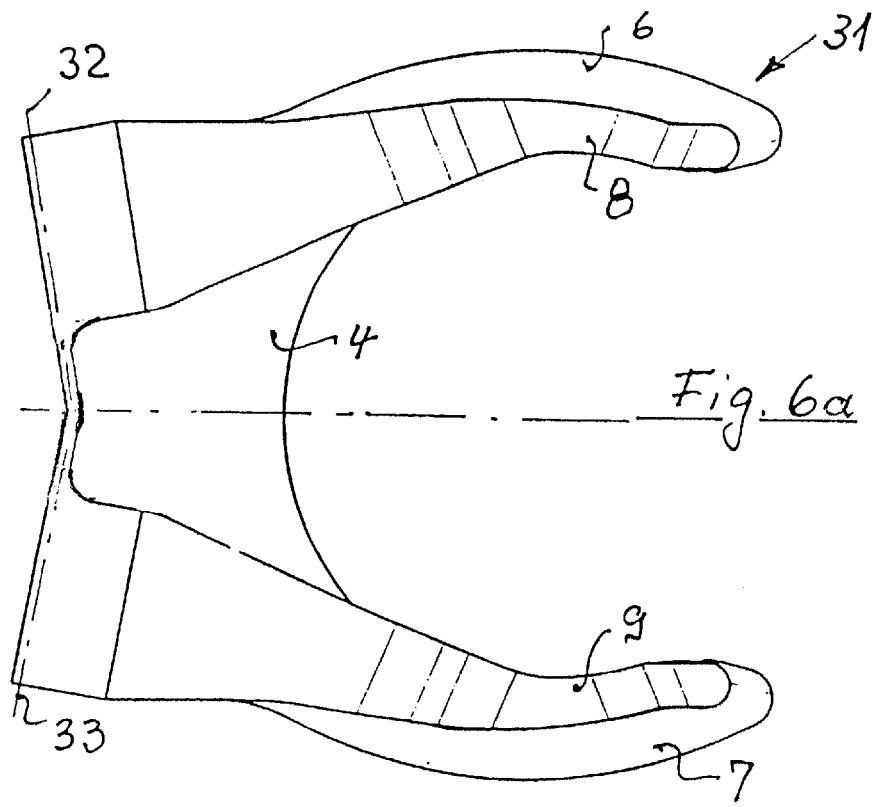
FIG. 6a shows an arrangement like that shown in FIG. 6, wherein however no cutout is provided in the leg area of the connector clamp of one pair of clamping arms.

As shown in FIG. 6a no cutout may be provided in the area of the web 3 and the leg 4 of the clamp back 2 to increase the pipe engagement rigidity of the clamp. The axes 32 and 33 extend essentially normal to the extension of the arms 8 and 9 respectively so that no twisting forces are effective spring arms 8 and 9.

Figure 6B:
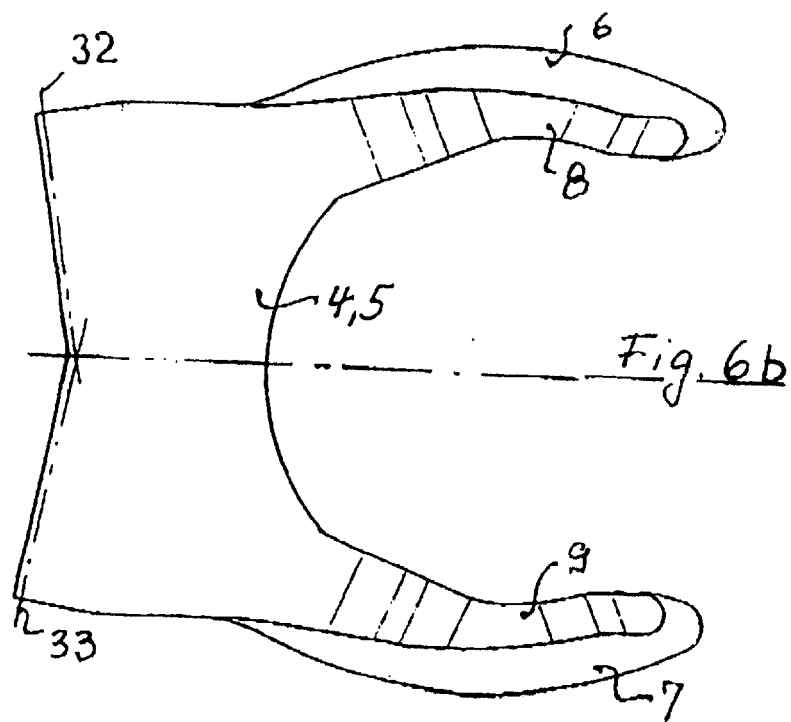
FIG. 6b shows an arrangement without any cutout in the leg or web areas of the connector clamp.

In FIG. 6b an arrangement is shown wherein the clamp back is angled but has no cut outs. However a small transversely elongated cutout 3a may be provided in the center of the clamp back as shown in FIGS. 1b and 2b in order to facilitate the shaping of the clamp.

FIGS. 2 to 4 show that the spring arms 6 to 9 are provided with projections and extrusions or similar structures as is common for such clamps and as they are indicated in FIGS. 2 to 4 generally by the reference numeral 13. By way of these projections, the connector flange engages the respective surface areas of the flanges of the pipes to be joined, which are not shown in the drawings. In this way, there are only essentially point-like contacts between the spring arms 6 to 9 and the respective flange surfaces. This is advantageous for an adaptation between flanges and connector clamp and reduces heat transfer from the pipe to the connector clamp.

What is claimed is:

1. A single-piece connector clamp for flange connections of pipe sections provided with connector flanges, said connector clamp being stamped out from a spring steel sheet and being bent over to provide a U-shaped spring back with a web structure and legs disposed opposite each other in the transverse direction of said web structure and spring arms extending from said legs in spaced relationship in the longitudinal direction of said web structure said spaced spring arms each forming a spring arm pair disposed at opposite sides of a reception space for said connector flanges of said pipe sections, said connector clamp including in the center area of said web structure a cutout, which extends from an edge at a base of a spring arm to the adjacent spring arm base so that the spring arms of the single piece connector clamp are supported resiliently for independent clamping action.

2. A single piece connector clamp according to claim 1, wherein said cutout extends only into part of said web structure.

3. A single piece connector clamp according to claim 1, wherein said cutout extends over the full width of said web structure forming separate web sections so that the arms at opposite sides of a pipe interconnected by said flange connector clamp are joined only by a leg portion of said clamp.

4. A single piece connector clamp according to claim 3, wherein the areas of the web structure at opposite sides of said cutout, that is, the spring back sections are disposed at an angle to each other whereby also the pivot axes of said spring arms are angled with respect to each other.

5. A single piece connector clamp according to claim 4, wherein the spring back sections extend at an obtuse angle with respect to each other, which is formed in the area between said spring arms.

6. A single piece connector clamp according to claim 4, wherein the spring back sections extend at an obtuse angle with respect to each other which is formed in the area opposite the area between said spring arms.

7. A single piece connector clamp according to claim 4, wherein said connector flange includes a transverse center plane and the pivot axes of the spring arms formed by the angled arrangement of the spring backs intersect in the transverse center plane of the connector flange.

8. A single piece connector clamp according to claim 1, wherein said cutout extends between the leg portions of the clamping arms over the full area between the legs.

9. A single piece connector clamp according to claim 1, wherein said cutout extends in the direction of the flange plane over part of the distance between the two spring arms forming a spring pair.

10. A single piece connector clamp according to claim 1, wherein said cutout extends over the full distance between spring arms forming a spring pair at one side of the flanges to be joined.

11. A single piece connector clamp according to claim 1, wherein the areas of the web structure at opposite sides of said cutout, that is, the spring back of the connector clamp are disposed in alignment with each other.

12. A single-piece connector clamp for flange connections of pipe sections provided with connector flanges, said connector clamp being stamped out from a spring steel sheet and being bent over to provide U-shaped spring back sections having legs disposed opposite each other in the transverse direction of a web and spring arms extending from said legs in spaced relationship in the longitudinal direction of said web, said spaced spring arms each forming a spring arm pair disposed at opposite sides of a reception space for said connector flanges of said pipe sections, said spring back sections extending at an angle with respect to each other, so as to provide also spring pivot axes which extend at said angle with respect to each other.

13. A single piece connector clamp according to claim 12, wherein said connector flange includes a transverse center plane and the pivot axes of the spring arms formed by the angled arrangement of the spring backs intersect in the transverse center plane of the connector flange.

14. A single piece connector clamp according to claim 13, wherein an opening is provided in the center of the web of said spring back sections at the intersection of said pivot axes.

* * * * *